United States Patent

Cox

[15] 3,691,450
[45] Sept. 12, 1972

[54] POWER INVERTER OSCILLATOR CIRCUIT

[72] Inventor: Jay A. Cox, Rolling Hills Estates, Calif. 90274

[73] Assignee: Gulton Industries, Inc., Metuchen, N.J.

[22] Filed: June 14, 1971

[21] Appl. No.: 152,615

Related U.S. Application Data

[63] Continuation-in-part of Ser. No. 20,609, March 18, 1970.

[52] U.S. Cl. .................................. 321/45 R, 315/105
[51] Int. Cl. ................................................ H02m 7/52
[58] Field of Search .............................. 321/43–45; 331/113 A; 315/97, 105

[56] References Cited

UNITED STATES PATENTS

| | | | |
|---|---|---|---|
| 3,248,640 | 4/1966 | Wellford | 321/45 |
| 3,256,495 | 6/1966 | Hunter | 331/113 A |
| 3,448,370 | 6/1969 | Harrigan | 321/45 |
| 3,579,026 | 5/1971 | Paget | 331/113 A |
| 3,593,109 | 7/1971 | Wellford | 331/113 A |

Primary Examiner—William M. Shoop, Jr.
Attorney—Sidney Wallenstein et al.

[57] ABSTRACT

A power inverter oscillator circuit including an output transformer with a primary winding, the opposite end of which are connected to the load terminals of a pair of power transistors and to the center-tap of which is connected a source of D.C. voltage. The transformer is provided with a feed-back secondary winding connected to the base terminals of the transistors. The oscillator circuit is provided with output transformer saturation and current overlap prevention means operable at least under load conditions and comprising resonant circuit-forming means coupled to a secondary winding of the transformer and inductance means coupled between the bases of the transistors for producing a sinusoidal-like waveform of voltage in the transformer windings, effecting the alternate switching of said transistors into conduction without the saturation of said output transformer, and effecting the complete cessation of flow of current through one of the transistors before current begins to flow in the other switch device.

10 Claims, 19 Drawing Figures

PATENTED SEP 12 1972　　3,691,450

INVENTOR.
JAY A. COX

BY WALLENSTEIN, SPANGENBERG,
HATTIS & STRAMPEL
ATTYS

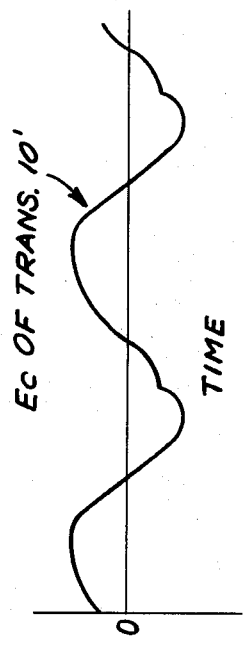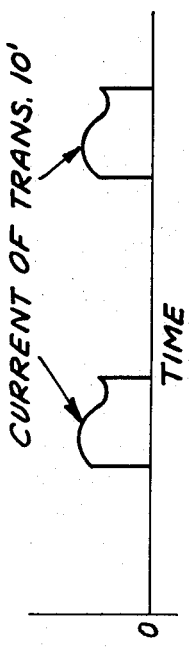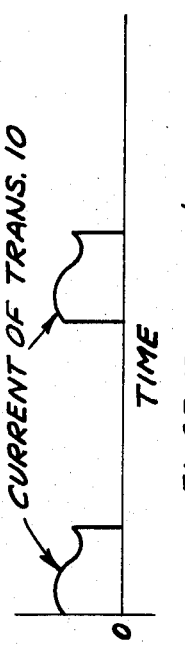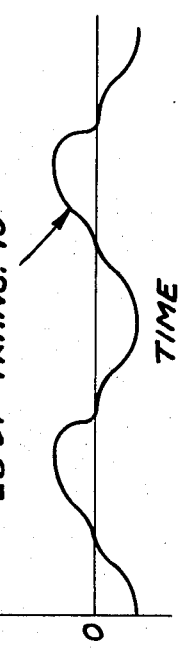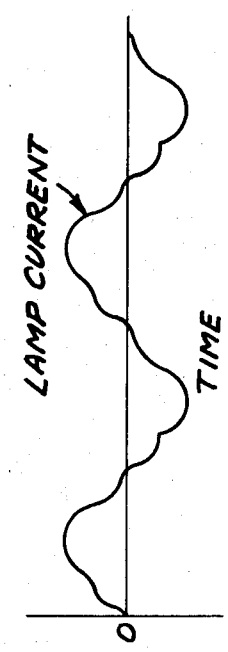
Fig. 4A  Fig. 4B  Fig. 4C  Fig. 4D  Fig. 4E
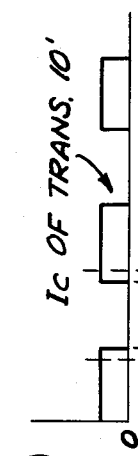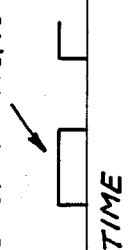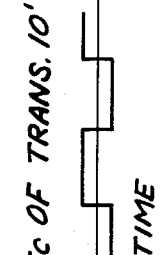
Fig. 3A  Fig. 3B  Fig. 3C
INVENTOR
JAY A. COX

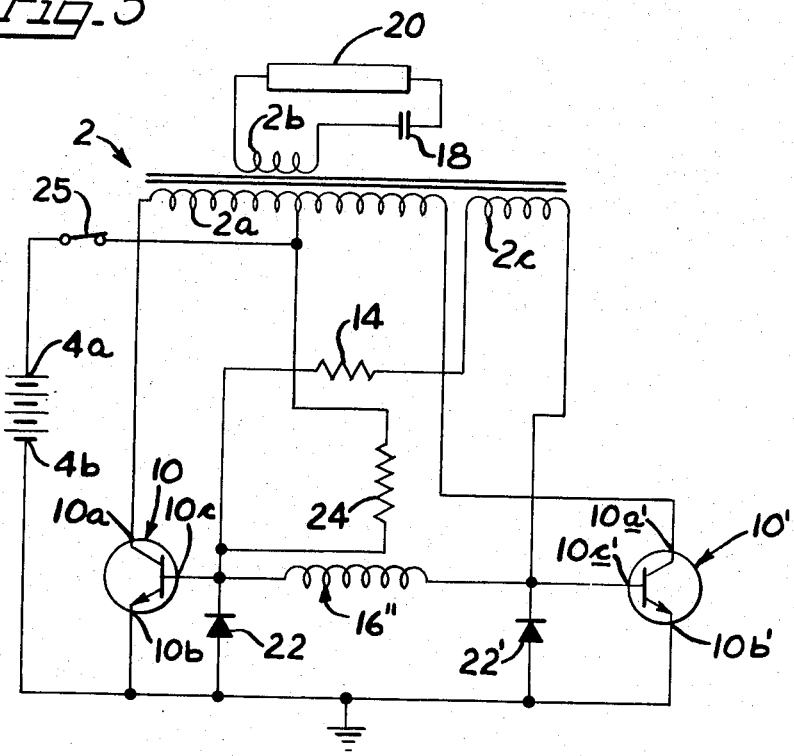

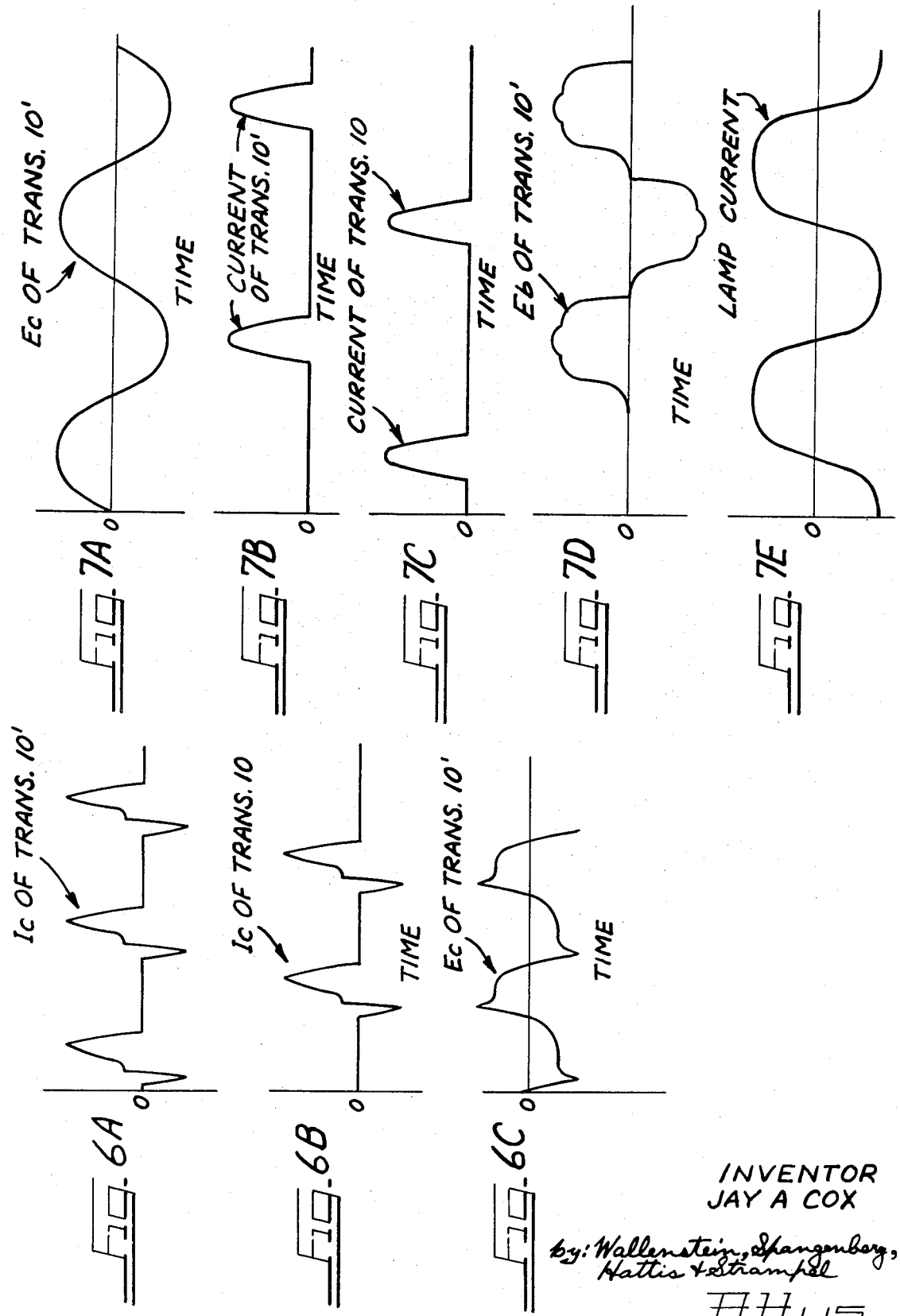

POWER INVERTER OSCILLATOR CIRCUIT

This application is a continuation-in-part of application Serial No. 20,609 filed March 18, 1970.

This invention relates to D.C. and A.C. inverter circuits for efficiently converting direct current to alternating current for a variety of applications, one of the most important of which is the energizing of fluorescent tube lighting units.

It has been previously known that a most efficient starting and operation of fluorescent tube lighting units is obtained with an exciting voltage of relatively high frequency, such as a frequency of 10,000 Hertz and higher. In such case, the high frequency voltage is best provided by an oscillator energized from a source of D.C. voltage. Where the initiation of the energization of fluorescent tube lighting units involves the application of an initially high A.C. voltage across the terminals thereof as, for example, 550 volts, following ignition of the gas in the fluorescent tube lighting unit, the tube operates most efficiently at a much lower voltage as, for example, 170 volts. This lower voltage is generally obtained by the use of a voltage dropping impedance commonly referred to as a ballasting impedance which is usually a capacitor or an inductance.

Circuits utilized for starting and operating fluorescent tube lighting units have left much to be desired from the standpoint of their reliability, efficiency of operation and their adverse affect on fluorescent tube life. The invention provides a highly unique power inverter circuit operated from a source of D.C. voltage (which may be a low voltage D.C. voltage such as from 12 to 28 volts) and which circuit efficiently converts the D.C. voltage to a relatively high frequency A.C. voltage which can be utilized both to initiate conduction of and operate fluorescent tube lighting fixtures. The power inverter circuit of the present invention also is useful for energizing a variety of loads which often causes difficulty for power inverter circuits, such as reactive loads, non-linear resistance loads or loads having negative resistance characteristics.

The power inverter oscillator circuit of the invention is a modification of a common type inverter circuit wherein a pair of transistors (or other similar switch devices) are connected to the opposite ends of the primary winding of an output transformer, the center-tap point of which is connected to one of the terminals of a source of D.C. Voltage. The transistors are alternately switched to a conductive state so that load current flows alternately in opposite directions through the two halves of the output transformer primary winding. The output transformer has at least one load energizing secondary winding and one or more feedback secondary windings, the one or more feedback secondary windings being coupled to the base or control electrodes of the transistors to form an inverter oscillator circuit where the voltage developed across the one or more feedback windings will be of a polarity which drives one of the transistors into conduction and inhibits conduction of the other of same.

In prior inverter oscillator circuits of the type described, the drive current which alternatively drive the transistors and which results from the voltage generated in one or more feedback secondary windings of the transformer is periodically terminated generally by the saturation of the core of the transformer which initiates a reversal of the polarity of the voltage in the feedback windings which speeds up reversal of the conductive states of the transistors. Such circuits usually produce a voltage of square waveform in the transformer windings. However, oscillators can be most efficiently designed where they produce sinusoidal-like waveforms. One of the most serious limitations in the efficiency of a circuit of the type described is the problem caused by what is sometimes referred to as the storage time of a transistor, which is the time required for a transistor to completely cease conduction once the transistor loses drive current. This delay time between the cessation of drive current and the actual cessation of load current through a transistor results in both of the inverter circuit transistors conducting at the same time for a time interval. This overlap of the conduction of transistors in a power inverter circuit as described frequently results under load conditions in the flow of very large currents through the two sections of the transformer primary winding which greatly lowers the efficiency of operation of the circuit. Efforts have been made to prevent such overlap of conduction with varying degrees of success.

The power inverter oscillator circuit of the invention overcomes this problem in a more simple and efficient manner than heretofore proposed by a unique power inverter circuit which produces a sinusoidal waveform. The most preferred form of the power inverter oscillator circuit of the invention is designed so that the operating efficiency of the circuit and the load, such as fluorescent tube lighting unit driven thereby, is optimized.

In the power inverter oscillator circuit of the invention, reversal of the conductive states of the transistors under load conditions without conduction overlap is obtained without the saturation of the output transformer core, and in a manner which produces most advantageously a sinusoidal-like output. This is best achieved by the combined action of an inductance and diode network coupled across the feedback winding and between the base terminals of the transistors and a resonant circuit coupled to a secondary winding of the output transformer. In one form of the invention, the inductance forming part of the inductance and diode network is a saturable reactor which saturates to initiate reversal of the conductive states of the transistors before any saturation of the output transformer core takes place. In another form of the invention, the inductance portion of the diode network does not saturate and the resonant circuit initiates reversal of the conductive states of the transistor. In both forms of the invention, the sinusoidal voltage produced by the resonant circuit operates alone or in conjunction with the above described non-saturating inductance to prevent current overlap of the transistors. Where the load is fluorescent tube lighting unit, the resonant circuit most advantageously includes a ballast capacitor and the inductance of the output transformer secondary winding in series with the fluorescent tube lighting unit.

In the latter form of the invention, where the inductance does not saturate, due to the presence of a sinusoidal-like waveform (i.e. a waveform which charges slowly rather than rapidly liked a square), the change of voltage on the feedback secondary winding means permits the inductance to speed up the cessation of current flow in a conducting transistor before the polarity of the voltage in the feedback secondary winding means reverses to effect conduction of the previously non-conducting transistor. In the form of the invention where the inductance is a saturating inductance, the sinusoidal-like voltage in the feedback winding slows or inhibits the conduction of the transistor which is non-conducting until current flow ceases in the conducting transistor.

The above and other advantages of the invention will become apparent and the novel features of the circuit of the present invention will be best understood upon making reference to the specification to follow, the claim and the drawings wherein:

Figure 1:
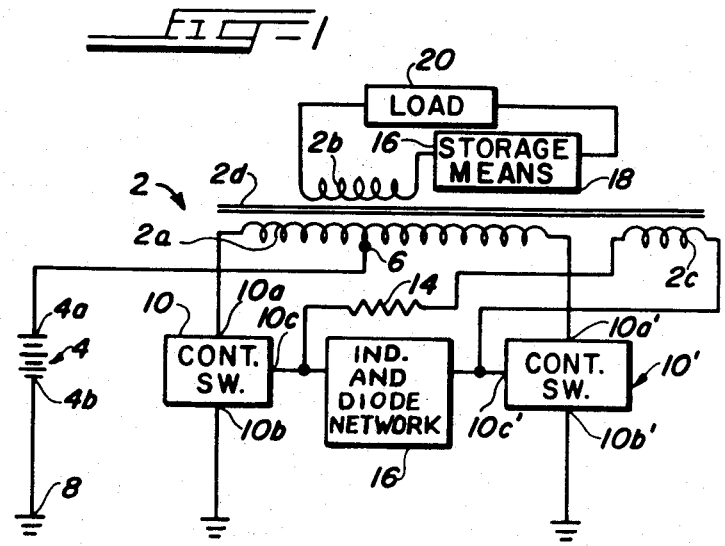
FIG. 1 is a simplified diagram of the present invention.
Figure 2:
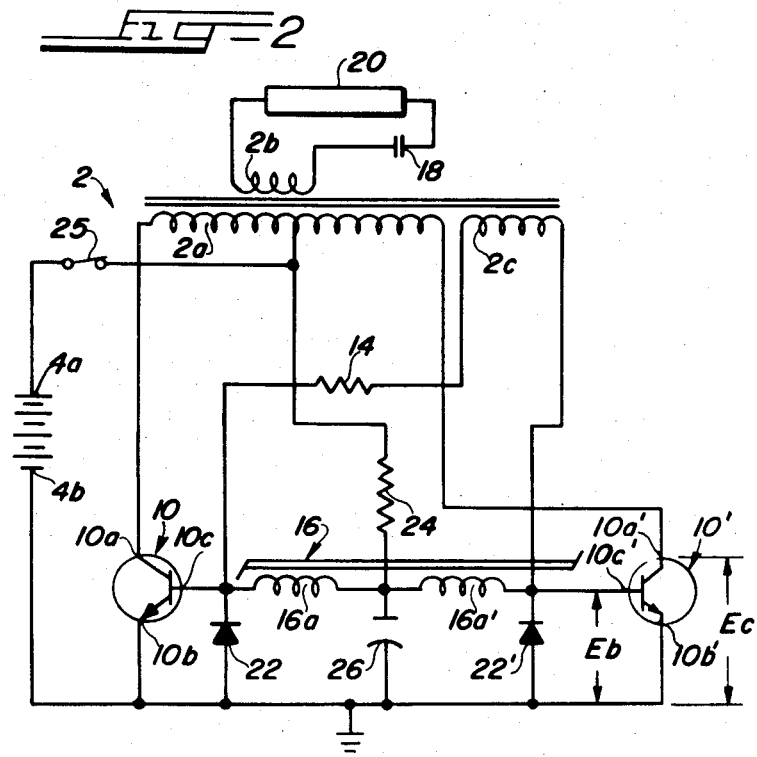
FIG. 2 shows an exemplary circuit for the invention illustrated in FIG. 1.

FIGS. 3A and 3B respectively show the waveforms of the current through the transistors of the circuit of FIG. 2 under no-load conditions;

FIG. 3C shows the waveform of the voltage on the collector electrode of one of the transistors in the circuit of FIG. 2 under no-load conditions;

FIG. 4A shows the waveform of the collector voltage of one of the transistors of the circuit of FIG. 2 under load conditions;

FIGs. 4B and 4C respectively shows the waveforms of the current flowing through the two transistors of the circuit of FIG. 2 under load conditions;

FIG. 4D shows the waveform of the base voltage of one of the transistors of FIG. 2 under load conditions;

FIG. 4E shows fluorescent lamp current of the circuit of FIG. 2;

FIG. 5 shows the preferred circuitry of the invention illustrated in FIG. 1;

FIGS. 6A and 6B respectively show the waveforms of the current flowing through the transistors of the circuit of FIG. 5 under no-load conditions;

FIG. 6C shows the waveform of the voltage on the collector of one of the transistors of the circuit of FIG. 5 under no-load conditions;

FIG. 7A shows the waveform of the collector voltage of one of the transistors in the circuit of FIG. 5 under load conditions;

FIGS. 7B and 7C respectively show the waveforms of the current flowing through the transistors of the circuit of FIG. 5 under load conditions;

FIG. 7D shows the waveform of the base voltage of one of the transistors of FIG. 5 under load conditions; and FIG. 7E shows the fluorescent lamp current of the circuit of FIG. 5.

Referring to FIG. 1, the power inverter oscillator circuit shown includes a transformer generally indicated by reference number 2, the transformer having a primary winding $2a$, a load energizing secondary winding $2b$, and a feedback secondary winding $2c$ wound on a core $2d$. One of the terminals $4a$ of a source of D.C. voltage is connected to a center tap point 6 of the primary winding $2a$. The opposite terminal $4b$ of the source of D.C. voltage is connected to a common reference point or ground 8. A pair of control switch devices 10 and 10', preferably junction transistors, are respectively connected between the opposite ends of the primary winding $2a$ and ground. The control transistors 10 and 10' respectively have load terminals (i.e. emitter and collector terminals) $10a$–$10b$ and $10a'$–$10b'$ respectively connected between the associated ends of the primary winding $2a$ and ground, and the control or base terminal $10c$ and $10c'$. One of the ends of the feedback secondary winding $2c$ is shown connected through a current-limiting resistor 14 to the base terminal $10c$ of transistor 10 and the other end of the feedback secondary winding $2c$ is shown connected to the base terminal $10c'$ of transistor 10'. Thus, at a given time, the polarity of the voltage on the feedback secondary winding $2c$ will be such as to aid conduction of one of the transistors and to inhibit or prevent conduction of the other transistor. Initiation of current flow in one of the transistors 10 or 10' will result in the generation of a voltage on feedback secondary winding $2c$ which will maintain co conduction of the initially conducting transistor and will render the other transistor non-conductive. The conductive states of the transistors alternate periodically. The initiation of a reversal of the conductive states of transistors 10 and 10' under load conditions, rather than being effected by the saturation of the core $2d$ of the transformer 2, is effected by other means to be described.

In one form of the invention shown in FIG. 2, inductance and diode network means 16 is provided with a saturable core reactor as shown in FIG. 2 effectively connected across the series circuit of the current limiting resistor 14 and the feedback secondary winding $2c$ and between the base terminals $10c$ and $10c'$ so that saturation of the saturable core reactor will short circuit any drive current from the conducting transistor 10 or 10'. The saturable core reactor prior to saturation thereof acts as a high impedance across the resistor 14 and the feedback secondary winding $2c$ and in parallel with the drive circuit of the transistors. The current progressively builds up in the saturable core reactor and after a given predetermined time the core saturates, whereupon the conducting transistor looses its drive current. Under no-load conditions of the particular circuit shown in FIG. 1, loss of drive current of the conducting transistor results in immediate reversal of the polarity of the voltages in the transformer windings, which substantially instantaneously results in a voltage in the feedback secondary winding $2c$ which drives the previously non-conducting transistor into conduction and inhibits conduction of the transistor which just lost its drive current. As previously indicated, the storage effect of transistors makes it impossible to stop transistor load current instantaneously upon cessation of drive current, and so a small overlap in the conducting periods of the transistors may result unless conduction of the previously non-conductive transistor is not delayed in some manner. Under no-load conditions when the magnitude of the currents flowing in the circuit is at very low levels, this overlapping of conduction does not result in intolerabl power losses. However, under load conditions where substantial current flows in the circuit, such overlap of conduction of the transistors causes intolerable substantial power losses because of the much greater than normal current which flows as a result of the conduction overlap.

At least under load conditions, the reversal of the voltage in the feedback secondary winding $2c$ when the conduction transistor loses its drive current is delayed for a time interval which permits current flow in the conducting transistor to reduce to zero before the other transistor begins its conduction, Preferably, the conducting intervals of the transistors are separated by an actual time interval. To this end, energy storage and release means 18 is provided in a secondary circuit of the transformer 2, most advantageously (although not necessarily), the load energizing secondary circuit of the secondary winding 2b. Each half cycle, the energy storage and release means 18 receives energy from the primary winding 2a during conduction of one of the transistors and feeds energy back through the transformer 2 when the conducting transistor loses its drive current, to generate a sinusoidal-like voltage in the feedback secondary winding 2c which continues the non-conductive condition of the non-conducting transistor. This energy storage and release means 18 is, most advantageously, a capacitor (see FIG. 2) which forms a shock excitable or quasi-resonant circuit with the other reactive impedance elements in the secondary circuit of the transformer 2, namely the inductance of the secondary winding 2b and any distributed capacitance forming a part thereof in the illustrated circuit. It was discovered that the capacitor 18 can also serve as a ballasting or voltage dropping impedance when the load 20 is a fluorescent tube lightin unit. In the resonant circuit referred to, to store and release energy each half cycle of operation of the power inverter circuit, the resonant frequency of this circuit must be of the same order of magnitude as the operating frequency of the overall oscillator circuit under load conditions which sould be from about ½ to about 1 ½ times the overall oscillator frequency. Under no-load conditions of the circuit being described where the capacitor 18 is in series with an open circuit, it does not store any energy which can be fed back to the primary circuit to delay conduction of the non-conducting transistor. It should be understood, however, that the energy storage and release means 18 could be associated with a separate secondary winding (such as winding 26) and receive sufficient current even under no-load conditions to operate the overall oscillator circuit so as to continue a conduction inhibiting voltage in the base circuit of the non-conducting transistor so that the transistors 10 and 10' cannot be simultaneously conducting.

For a more complete showing of the exemplary circuit of the present invention, reference should now be made particularly to FIG. 2 and to the waveforms shown in FIGS. 3A, 3B, 3C, 4A, 4B, 4C, 4D and 4E. The transistors 10 and 10' are NPN transistors having their collector electrode terminals 10a and 10a' respectively connected to the opposite ends of the primary winding 2a of the output transformer 2. The saturable core reactor 16 has two winding sections 16a and 16a' connected in series between the base electrode terminals 10c and 10c' of the transistors 10 and 10'. Diodes 22 and 22' forming part of the aforesaid inductance and diode network means 16 are connected between the base electrode terminals 10c and 10c', respectively, and ground, the cathode electrodes 22a and 22a' of these diodes being respectively connected to the base electrode terminals 10c and 10c' referred to.

When the polarity of the voltage on the feedback secondary winding 2c is such that the left end is positive with respect to the right end thereof as viewed in FIG. 2, the transistor 10 will be driven into a highly conductive state and the transistor 10' will be in a relatively non-conductive state. A loop circuit can then be traced extending through the emitter and base terminals 10b and 10c of the transistor 10, resistor 14, feedback secondary winding 2c and a diode 22'. The voltage drop across the diode 22' will be such that the cathode is negative with respect to the anode thereof so the voltage drop will bias the transistor 10' into a non-conductive state. Also, the polarity of the voltage in the loop circuit is such that the diode 22 is non-conductive. The voltage developed across the feedback secondary winding will cause a gradual build-up of current in the saturable core winding section 16a and 16a' and finally the core 16b thereof will saturate, whereupon the conducting transistor 10 loses its drive current. Under no-load conditions of operation, the polarity of the voltage in the windings of the transformer will then reverse, thereby unsaturating the core. Also, the previously non-conducting transistor 10' will be driven almost instantaneously into a conducting state and the previously conducting transistor 10 will, after a short interval determined by the storage time, cease conducting and will be held by the negative voltage across the newly conducting diode 22 in a non-conductive state. It is possible that there will be a momentary overlap in the conducting periods of the transistors 10 and 10' which, as above indicated, is tolerable under no-load conditions. FIGS. 3A and 3B respectively show the alternating time intervals during which current flows through the transistors 10 and 10' under no-load conditions, with the overlapping current conducting being indicated by the time intervals t1 and t1'. FIG. 3C illustrates the square waveform of the collector to ground voltage Ec of the transistor 10'.

Means are provided for establishing drive current for one of the transistors when the circuit is initially energized so that the oscillator can begin oscillating. This means includes a resistor 24 connected between the center tap point of the primary winding 2a and the juncture between the winding sections 16a and 16a' of the saturable core reactor 16. This means further includes a capacitor 26 connected between the latter point and ground. The capacitor 26 is relatively large (e.g. 100 microfarads) and the resistor 24 is also relatively large (e.g. 1,200 ohms). The resistor 24 is a means for connecting the positive terminal of the source of D.C. voltage 4 to the base electrode terminals 10c and 10c' when power is initially applied to the circuit, such as upon closure of a switch 25 in the line between the latter terminal and the center tap of the primary winding 2a of the transformer 2. Once the oscillator starts oscillating, the time constant of the circuit comprising the resistor 24 and the capacitor 26 is so long relative to the frequency of operation of the oscillator that the capacitor 26 never becomes fully charged where the voltage thereon could cause continued conduction of both transistors 10 and 10' independently of the voltage conditions in the feedback secondary winding 2c.

The voltage and current conditions in the circuit now being described under load conditions is illustrated in FIGS. 4A–4E to which reference should now be made. FIG. 4A shows the collector voltage Ec between the collector electrode terminal 10a' and ground of the transistor 10', and the current pulsation flowing through the transistor 10 and 10'. It is noted that the transistors 10 and 10' conduct during intervals which are spaced apart by intervening time intervals. Also, the collector voltage waveform resembles a sine-wave. FIG. 4E illustrates the waveform of current flowing through the fluorescent tube lighting unit 20 which results in a sinusoidal waveform. FIG. 4D shows voltage Ec and the base voltage Eb of the transistor 10'.

Reference should now be made to FIG. 5 which shows a modification of the circuit of FIG. 2. Corresponding elements of the circuit of FIGS. 2 and 5 have been similarly numbered, it being understood that unless otherwise stated, similarly numbered elements operate in the same or similar manner as described in connection with the FIG. 2 circuit. The circuit of FIG. 5 differs from the circuit of FIG. 2 in using a non-saturating inductor 16" connected between the base electrode terminals 10c–10c' of the transistors 10–10'. The diodes 22 and 22' connected between the opposite ends of the inductor 16" and ground cooperate with the inductor 16" and the sinusoidal-like voltage generated in the feedback secondary winding 2c to maintain substantial separation between the periods of current conduction of the transistors 10–10' under load conditions. Under no-load conditions, the circuit of FIG. 5 operates similarly to a power inverter circuit which generates a square waveform under conditions where the output transformer saturates each half cycle of the voltage involved. The square waveform of the collector voltage under no-load conditions is shown in FIG. 6. (The voltage waveform across the windings of the transformer under no-load conditions appear similar to the waveform shown in FIG. 6c). FIGS. 6A and 6B show the waveforms of the current flowing through the transistors 10–10' under no-load conditions and, as there shown, there is a little or no separation of the instants of current flow through the transistors 10–10'. Under such no-load conditions, the inductor 16" functions somewhat to prevent overlap of current flow between the transistors 10–10', but this function of the inductor 16" under no-load conditions is of relatively little importance, and thus its mode of operation will be discussed primarily in connection with operation of the circuit under load conditions.

When the fluorescent tube lightin unit or other load 20 connected in series with the load energizing secondary winding and capacitor 18' draws load current, a new mode of operation of the circuit is initiated where the output transformer 2 is not saturated as under no-load conditions, and the reversal of the conduction states of the transistors 10–10' is under control of the sinusoidal-like voltage produced by the resonant circuit primarily including the capacitor 18' and the equivalent inductance viewed from the secondary circuit involved. This resonant circuit is the means which principally determines the frequency of the oscillator circuit under load conditions. Like the resonant circuit of the FIG. 2, the resonant circuit is shock excited each time one of the transistors 10 and 10' becomes conductive. The waveform produced by the shock excited resonant circuit of FIG. 5 is a constant amplitude sinusoidal-like waveform having the frequency of the oscillator circuit. FIG. 7A illustrates the waveform of the voltage produced between the collector electrode terminal of one of the transistors 10 and ground under load conditions of operation. A somewhat distorted but similar sinusoidallike voltage is present in the winding of the transformer.

In the manner to be described, the sinusoidal-like voltage appearing across the feedback secondary winding 2c cooperating with the inductor 16" will result in substantial separation of the current pulses passing through the transistors 10 and 10', as illustrated in FIGS. 7B and 7C. Thus, assuming that the left transistor 10 is conducting, the left end of the feedback secondary winding 2c will be positive with respect to the right end thereof. This voltage will maintain the right transistor 10' non-conducting and established a loop circuit for current flow extending from ground through the right hand diode 22', the feedback secondary winding c, c the resistor 14, and the base and emitter terminals of the left hand transistor 10. The left hand diode 22 will be reversed biased into a non-conductive condition. Note that the voltage drop across the conducting diode 22' will bias the base to emitter circuit of the right transistor 10' to maintain the same non-conductive.

The inductor 16" forms a second loop circuit for current flow which includes the inductor 16", feedback secondary winding 2c and the resistor 14. It can be seen that the resultant base to emitter drive voltage for the left hand transistor 10 is the sum of the voltage across inductor 16" whose left end will, during most of the conducting period of the transistor 10, be positive with respect to the right end thereof and will thus oppose the voltage drop across diode 22'. The current flowing through the inductor 16" is dependent upon the voltage applied thereacross from the feedback secondary winding 2c. As the voltage across the feedback secondary winding 2c starts to decrease following the maximum 90° point in the voltage waveform involved, the resulting tendency of the current through the inductor 16" to decrease will be opposed by the generation of a current sustaining back EMF which will act to oppose or slow the decrease in current flow through the inductor. This back EMF is a voltage component which is negative at its left end of the inductor 16" so it adds to the decreasing voltage across the feedback secondary winding 2c. In effect, therefore, this back EMF voltage will cause the transistor 10 to become non-conductive before the voltage across the feedback winding 2c goes through zero, and reverses in polarity. The right transistor 10', on the other hand, cannot start conduction until the polarity of the voltage on the feedback winding 2c reverses polarity. It can thus be seen that the sinusoidal-like waveform of voltage in the feedback winding 2c in conjunction with the inductor 16" substantially separates the current pulses flowing through the transistors 10 and 10', as illustrated in FIGS. 7B and 7C.

The manner in which the right transistor 10' is rendered non-conductive before the left transistor 10 starts conducting during the next half cycle of operation is the same as just described, except that the loop circuit carrying current includes the left diode 22 instead of the right diode 22', and the polarity of the voltages described will be reversed.

In both the forms of the invention shown in FIGS. 2 and 5, it is thus seen that the provisions of a shock excitable resonant circuit in the secondary circuit of the transformer 2 operates in conjunction with an inductor and diode circuit associated with the base control terminals of transistors 10 and 10' to produce a very efficiently operating power inverter oscillator circuit producing a sinusoidal-like output with current separation between the current flowing in the transistors 10 and 10'.

As previously indicated, the present invention has provided an exceedingly efficient and reliable power inverter oscillator circuit for operating fluorescent tube lighting units as well as other types of difficult to operate loads, such as reactive loads and loads having non-linear resistances and the like.

It should be understood that numerous modifications may be made in the preferred circuit described without deviating from the broader aspects of the invention.

I claim:

1. In combination: a load device which normally offers a very high impedance until excited into a relatively low resistance state by an A.C. voltage of a given frequency; and a D.C. to A.C. power inverter oscillator circuit for energizing said load device, said power inverter circuit comprising a pair of D.C. input terminals across which a D.C. voltage is to appear, a pair of switch devices each having control and load terminals, an output transformer having primary winding means and secondary winding means including load energizing and feedback winding means, means coupling said load terminals of said switch devices to the opposite ends of said primary winding means and one of said D.C. input terminals, means coupling the other of said D.C. input terminals to a point intermediate the ends of said primary winding means so load current flowing through the load terminals of said switch devices flow in opposite directions through said primary winding means, oscillator circuit-forming means connected between the control terminals of said switch devices and said feedback winding means which oscillator circuit-forming means would normally form a square wave oscillator circuit where said switch devices are rendered alternately conductive at said given frequency determined by the half cycle saturation of said output transformer and the feeding of a conduction imparting drive voltage from said feedback secondary winding means to the control terminals of said switch devices, with the possibility of overlap in the conducting periods of the switch devices due to the inability of a conducting switch device to cease conduction instantaneously upon cessation of the feeding of said conduction imparting drive voltage thereto, output transformer saturation and current overlap prevention means operable at least under load conditions and comprising resonant circuit-forming means coupled to one of the secondary winding means and inductance means coupled between the control terminals of said switch devices for producing a sinusoidal-like waveform of voltage in the transformer windings, effecting the alternate switching of said switch devices into conduction without the saturation of said output transformer, and effecting the complete cessation of flow of current through one of the switch devices before current begins to flow in the other switch device, and said voltage of said given frequency generated by said oscillator circuit triggering said load device into said low resistance state, said resonant circuit-forming means then becoming effective to lower the frequency of the oscillator circuit.

2. The combination of claim 1 wherein said switch devices are transistors each having emitter base and collector terminals, and there are provided respective rectifier means coupled between the base and emitter terminals of said transistors, the rectifier means associated with the non-conducting transistor establishing a loop circuit for current flow extending through the base and emitter terminals of the conducting transistor and said feedback secondary winding means, the other rectifier means being biased to non-conduction by the voltage across the feedback secondary winding means.

3. The combination of claim 1 wherein said inductance means saturates to initiate a reversal of conduction of the switch device.

4. A D.C. to A.C. power inverter oscillator circuit for energizing a given load device, said circuit comprising: a pair of D.C. input terminals across which a D.C. voltage is to appear; a pair of switch devices each having control and load terminals; an output transformer having primary winding means and secondary winding means including load energizing and feedback winding means; means coupling said load terminals of said switch devices to the opposite ends of said primary winding means and one of said D.C. input terminals; means coupling the other of said D.C. input terminals to a point intermediate the ends of said primary winding means so load current flowing through the load terminals of said switch devices flow in opposite directions through said primary winding means; oscillator circuit-forming means connected between the control terminals of said switch devices and said feedback winding means which oscillator circuit-forming means would normally form a square wave oscillator circuit where said switch devices are rendered alternately conductive at a given frequency determined by the half cycle saturation of said output transformer and the feeding of a conduction imparting drive voltage from said feedback secondary winding means to the control terminals of said switch devices, with the possibility of overlap in the conducting periods of the switch devices due to the inability of a conducting switch device to cease conduction instantaneously upon cessation of the feeding of said conduction imparting drive voltage thereto; and output transformer saturation and current overlap prevention means operable at least under load conditions and comprising resonant circuit-forming means coupled to one of the secondary winding means and inductance means coupled between the control terminals of said switch devices for producing a sinusoidal-like waveform of voltage in the transformer windings, effecting the alternate switching of said switch devices into conduction without the saturation of said output transformer, and effecting the complete cessation of flow of current through one of the switch devices before current begins to flow in the other switch device, the resonant circuit formed by said resonant circuit-forming means being shock excited each time one of the switch devices is rendered conductive to effect generation of a sinusoidal-like waveform in the transformer winding fed back to the control terminals of said switch devices.

5. The power inverter oscillator circuit of claim 4 in combination with a load device coupled across said load energizing winding means which load device normally offers a very high impedance until excited into a relatively low resistance state by the initial voltage produced by the power inverter oscillator circuit under no load conditions, said resonant circuit-forming means then becoming effective to lower the frequency of the oscillator circuit.

6. The combination of claim 5 wherein said load device is a fluorescent tube lighting device.

7. The combination of claim 1 wherein said resonant circuit forming means is in series with said load device and becoming effective to lower the frequency of the oscillator circuit when said load device is in said load resistance state.

8. The combination of claim 7 wherein said load device is a fluorescent tube lighting device.

9. The combination of claim 8 wherein said resonant circuit-forming means includes a capacitor in series with said fluorescent tube lighting device which capacitor acts also as a ballast impedance upon the triggering of said device into said conducting state.

10. The combination of claim 1 wherein there is a large step-turn ratio between said primary winding means and said load energizing winding means.

* * * * *